United States Patent
Tooher et al.

(10) Patent No.: US 12,507,280 B2
(45) Date of Patent: Dec. 23, 2025

(54) METHODS FOR RECEPTION OF CSI-RS AND CSI FEEDBACK IN NR-U

(71) Applicant: INTERDIGITAL PATENT HOLDINGS, INC., Wilmington, DE (US)

(72) Inventors: J. Patrick Tooher, Montreal (CA); Mouna Hajir, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 657 days.

(21) Appl. No.: 17/634,710

(22) PCT Filed: Aug. 13, 2020

(86) PCT No.: PCT/US2020/046192
§ 371 (c)(1),
(2) Date: Feb. 11, 2022

(87) PCT Pub. No.: WO2021/030595
PCT Pub. Date: Feb. 18, 2021

(65) Prior Publication Data
US 2022/0287094 A1 Sep. 8, 2022

Related U.S. Application Data

(60) Provisional application No. 62/886,159, filed on Aug. 13, 2019.

(51) Int. Cl.
*H04W 4/00* (2018.01)
*H04L 5/00* (2006.01)
(Continued)

(52) U.S. Cl.
CPC ....... *H04W 74/0816* (2013.01); *H04L 5/0051* (2013.01); *H04W 72/0446* (2013.01); *H04W 74/0866* (2013.01)

(58) Field of Classification Search
CPC ......... H04W 74/0816; H04W 72/0446; H04W 74/0866; H04W 72/23; H04L 5/0051;
(Continued)

(56) References Cited

U.S. PATENT DOCUMENTS 10,034,306 B2 * 7/2018 Goto ................ H04W 56/0015
10,405,299 B2    9/2019 Rico Alvarino et al.
(Continued)

FOREIGN PATENT DOCUMENTS

WO    2016/122254    8/2016
WO    2017/190273    11/2017

OTHER PUBLICATIONS

Ericsson, "On aperiodic reference signals for NR-U," 3GPP TSG-RAN WG1 Meeting #97, R1-1907461, Reno, NV, USA (May 13-17, 2019).
(Continued)

*Primary Examiner* — Amancio Gonzalez
(74) *Attorney, Agent, or Firm* — VOLPE KOENIG

(57) ABSTRACT

A method for use in a wireless transmit/receive unit is disclosed. The method may comprise: obtaining a transmission occasion for a channel state information reference signal (CSI-RS); obtaining at least one conditional transmission occasion for the CSI-RS; and determining whether the CSI-RS is transmitted in the transmission occasion, wherein on a condition that the CSI-RS is not transmitted in the transmission occasion, detecting if the CSI-RS is transmitted in one of the at least one conditional transmission occasion.

20 Claims, 8 Drawing Sheets

(51) Int. Cl.
  *H04W 72/0446* (2023.01)
  *H04W 74/08* (2009.01)
  *H04W 74/0816* (2024.01)

(58) Field of Classification Search
  CPC ..... H04L 5/0007; H04L 5/001; H04L 5/0048; H04L 5/0055; H04L 27/0006; H04L 5/0082; H04L 5/0091; H04L 5/0094; H04L 5/005
  USPC ......................................................... 370/329
  See application file for complete search history.

(56) References Cited

U.S. PATENT DOCUMENTS

| | | | |
|---|---|---|---|
| 10,536,931 B2* | 1/2020 | Goto | H04W 72/0446 |
| 10,652,753 B2* | 5/2020 | Choi | H04L 1/00 |
| 10,681,648 B2* | 6/2020 | Jeon | H04W 52/281 |
| 10,785,669 B2* | 9/2020 | Kim | H04L 5/0048 |
| 10,840,984 B2 | 11/2020 | Mazzarese et al. | |
| 11,088,901 B2* | 8/2021 | Sun | H04W 76/27 |
| 11,096,066 B2* | 8/2021 | Guo | H04W 16/28 |
| 11,096,218 B2* | 8/2021 | Qian | H04W 24/10 |
| 11,202,315 B2* | 12/2021 | Rastegardoost | H04W 74/006 |
| 11,290,226 B2* | 3/2022 | Xu | H04L 5/0039 |
| 11,316,650 B2* | 4/2022 | Yang | H04L 5/0053 |
| 11,405,874 B2* | 8/2022 | Zhou | H04W 52/284 |
| 11,412,422 B2* | 8/2022 | Rastegardoost | H04W 36/0077 |
| 11,456,793 B2* | 9/2022 | Zhou | H04W 72/0466 |
| 11,456,831 B2* | 9/2022 | Si | H04L 5/0094 |
| 11,477,813 B2 | 10/2022 | Lee et al. | |
| 11,483,784 B2* | 10/2022 | Tomeba | H04B 7/0413 |
| 11,503,544 B2* | 11/2022 | Ahmad | H04W 72/23 |
| 11,696,142 B2* | 7/2023 | Si | H04L 1/1614 370/329 |
| 11,722,257 B2* | 8/2023 | Yang | H04L 1/1635 370/329 |
| 11,723,063 B2* | 8/2023 | Islam | H04W 52/281 370/329 |
| 11,723,106 B2* | 8/2023 | Deenoo | H04W 76/28 370/329 |
| 11,785,543 B2* | 10/2023 | Catovic | H04W 74/0808 370/318 |
| 12,003,333 B2* | 6/2024 | Baldemair | H04L 1/1864 |
| 2014/0362780 A1 | 12/2014 | Malladi et al. | |
| 2016/0227428 A1* | 8/2016 | Novlan | H04W 24/10 |
| 2016/0242054 A1 | 8/2016 | Lee et al. | |
| 2016/0277165 A1 | 9/2016 | Wei | |
| 2017/0318568 A1 | 11/2017 | Nimbalker et al. | |
| 2018/0019855 A1 | 1/2018 | Zhang et al. | |
| 2018/0227156 A1 | 8/2018 | Papasakellariou | |
| 2019/0007897 A1 | 1/2019 | Ng et al. | |
| 2020/0084714 A1* | 3/2020 | Medles | H04W 24/10 |
| 2020/0100197 A1* | 3/2020 | Pan | H04W 72/0446 |
| 2020/0137821 A1* | 4/2020 | Cirik | H04W 72/1268 |
| 2020/0305038 A1 | 9/2020 | Tooher et al. | |
| 2021/0028844 A1* | 1/2021 | Song | H04B 17/327 |
| 2021/0306824 A1* | 9/2021 | Li | H04W 4/40 |
| 2021/0345299 A1* | 11/2021 | Gao | H04W 72/02 |
| 2021/0410084 A1* | 12/2021 | Li | H04W 52/265 |
| 2022/0053576 A1* | 2/2022 | Lu | H04W 74/0841 |
| 2022/0124761 A1* | 4/2022 | Muruganathan | H04W 72/1273 |
| 2022/0150839 A1* | 5/2022 | Islam | H04W 52/08 |
| 2022/0216944 A1* | 7/2022 | Muruganathan | H04W 72/0446 |
| 2024/0204846 A1* | 6/2024 | Zhang | H04B 7/063 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital, Inc., "DL signals and channels for gNB initiated COT," 3GPP TSG RAN WG1 #98, R1-1909009, Prague, CZ (Aug. 26-30, 2019).

Interdigital, Inc., "DL signals and channels for NR-U," 3GPP TSG RAN WG1 #98bis, R1-1910938, Chongqing, China (Oct. 14-20, 2019).

Interdigital, Inc., "DL signals and channels for NR-U," 3GPP TSG RAN WG1 #99, R1-1912695, Reno, U.S.A. (Nov. 18-22, 2019).

Interdigital, Inc., "On Downlink Signals and Channels for NR-U," 3GPP TSG RAN WG1 Meeting #94, R1-1809087, Gothenburg, Sweden (Aug. 20-24, 2018).

Qualcomm Inc., "New WID on NR-based Access to Unlicensed Spectrum," 3GPP TSG RAN Meeting #82 RP-182878, Sorrento, Italy (Dec. 10-13, 2018).

Third Generation Partnership Project, "Technical Specification Group Radio Access Network; NR; Physical layer procedures for control (Release 15)," 3GPP TS 38.213 V15.3.0 (Sep. 2018).

Third Generation Partnership Project, "Technical Specification Group Radio Access Network; NR; Physical layer procedures for control (Release 15)," 3GPP TS 38.213 V15.6.0 (Jun. 2019).

Third Generation Partnership Project, "Technical Specification Group Radio Access Network; NR; Physical layer procedures for control (Release 15)," 3GPP TS 38.213 V15.10.0 (Jun. 2020).

Third Generation Partnership Project, "Technical Specification Group Radio Access Network; NR; Physical layer procedures for control (Release 16)," 3GPP TS 38.213 V16.2.0 (Jun. 2020).

Third Generation Partnership Project, "Technical Specification Group Radio Access Network; NR; Medium Access Control (MAC) protocol specification (Release 15)," 3GPP TS 38.321 V15.1.0 (Mar. 2018).

Third Generation Partnership Project, "Technical Specification Group Radio Access Network; NR; Medium Access Control (MAC) protocol specification (Release 15)," 3GPP TS 38.321 V15.6.0 (Jun. 2019).

Third Generation Partnership Project, "Technical Specification Group Radio Access Network; NR; Medium Access Control (MAC) protocol specification (Release 16)," 3GPP TS 38.321 V16.1.0 (Jul. 2020).

Third Generation Partnership Project, "Technical Specification Group Radio Access Network; NR; Medium Access Control (MAC) protocol specification (Release 15)," 3GPP TS 38.321 V15.9.0 (Jul. 2020).

Third Generation Partnership Project, Technical Specification Group Radio Access Network; NR; Radio Resource Control (RRC) protocol specification (Release 15), 3GPP TS 38.331 V15.10.0 (Jul. 2020).

(56) References Cited

OTHER PUBLICATIONS

Third Generation Partnership Project, "Technical Specification Group Radio Access Network; NR; Radio Resource Control (RRC) protocol specification (Release 16)," 3GPP TS 38.331 V16.1.0 (Jul. 2020).
Third Generation Partnership Project, "Technical Specification Group Radio Access Network; NR; Radio Resource Control (RRC) protocol specification (Release 15)," 3GPP TS 38.331 V15.6.0 (Jun. 2019).
Third Generation Partnership Project, "Technical Specification Group Radio Access Network; NR; Physical layer procedures for data (Release 15)," 3GPP TS 38.214 V15.6.0 (Jun. 2019).
Third Generation Partnership Project, "Technical Specification Group Radio Access Network; NR; Physical layer procedures for data (Release 15)," 3GPP TS 38.214 V15.10.0 (Jun. 2020).
Third Generation Partnership Project, "Technical Specification Group Radio Access Network; NR; Physical layer procedures for data (Release 16)," 3GPP TS 38.214 V16.2.0 (Jun. 2020).
Third Generation Partnership Project, "Technical Specification Group Radio Access Network; Study on NR-based access to unlicensed spectrum (Release 16)," 3GPP TR 38.889 V16.0.0 (Dec. 2018).
Third Generation Partnership Project, "Technical Specification Group Radio Access Network; NR; Physical channels and modulation (Release 15)," 3GPP TS 38.211 V15.6.0 (Jun. 2019).
Third Generation Partnership Project, "Technical Specification Group Radio Access Network; NR; Physical channels and modulation (Release 15)," 3GPP TS 38.211 V15.8.0 (Dec. 2019).
Third Generation Partnership Project, "Technical Specification Group Radio Access Network; NR; Physical channels and modulation (Release 16)," 3GPP TS 38.211 V16.2.0 (Jun. 2020).

* cited by examiner

METHODS FOR RECEPTION OF CSI-RS AND CSI FEEDBACK IN NR-U

CROSS-REFERENCE TO RELATED APPLICATIONS

This application is the U.S. National Stage, under 35 U.S.C. § 371, of International Application No. PCT/US2020/046192 filed Aug. 13, 2020, which claims the benefit of U.S. Provisional Application No. 62/886,159, filed Aug. 13, 2019, the contents of which are incorporated herein by reference.

BACKGROUND

Transmissions in New Radio Unlicensed spectrum (NR-U) are subject to the channel having been acquired. Therefore, signals with fixed periodicities may not be transmitted at every configured occasion. Examples of such signals include periodic or semi-persistent Channel State Information Reference Signal (CSI-RS). Nevertheless, there are benefits to configuring periodic or semi-persistent CSI-RS in NR-U. For example, the signaling overhead is reduced when compared to aperiodic CSI-RS. Maximum Channel Occupancy Time (COT) duration means that any reduction in signaling, and thus reduction in channel acquisition, is beneficial. Another benefit is that a WTRU (Wireless Transmit/Receive Unit) may be able to receive CSI-RS even outside of a formally defined COT.

However, a problem may arise in that a WTRU must determine whether a CSI-RS was actually transmitted in an occasion or whether it was dropped due to the channel having not been acquired. This is necessary given that it may impact the measurements that the WTRU may perform and may lead to incorrect assumptions on the channel characteristics. Such incorrect measurements, assumptions and measurement feedback may lead to incorrect WTRU scheduling, which may greatly impact system throughput. Furthermore, incorrect measurements may lead to unnecessary feedback reports which may also reduce overall system performance due to unnecessary channel acquisition.

SUMMARY

A method for use in a wireless transmit/receive unit is disclosed. The method may comprise: obtaining a transmission occasion for a channel state information reference signal (CSI-RS); obtaining at least one conditional transmission occasion for the CSI-RS; and determining whether the CSI-RS is transmitted in the transmission occasion, wherein on a condition that the CSI-RS is not transmitted in the transmission occasion, detecting if the CSI-RS is transmitted in one of the at least one conditional transmission occasion.

A wireless transmit/receive unit (WTRU) is disclosed. The WTRU may comprise: a processor, configured to obtain a transmission occasion for a channel state information reference signal (CSI-RS); obtain at least one conditional transmission occasion for the CSI-RS; and determine whether the CSI-RS is transmitted in the transmission occasion, wherein on a condition that the CSI-RS is not transmitted in the transmission occasion, the processor is further configured to detect if the CSI-RS is transmitted in one of the at least one conditional transmission occasion.

As discussed, in order to prevent incorrect measurements as well as incorrect measurement feedback, methods are needed to enable the WTRU to determine whether a CSI-RS is present. Methods may also be needed to increase the robustness of CSI-RS transmission considering the need for successful channel acquisition prior to transmission. The WTRU may also need methods to handle measurements and report appropriate values considering missing CSI-RS transmissions. Moreover, feedback resources may also require an increase in robustness considering the channel acquisition requirement.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
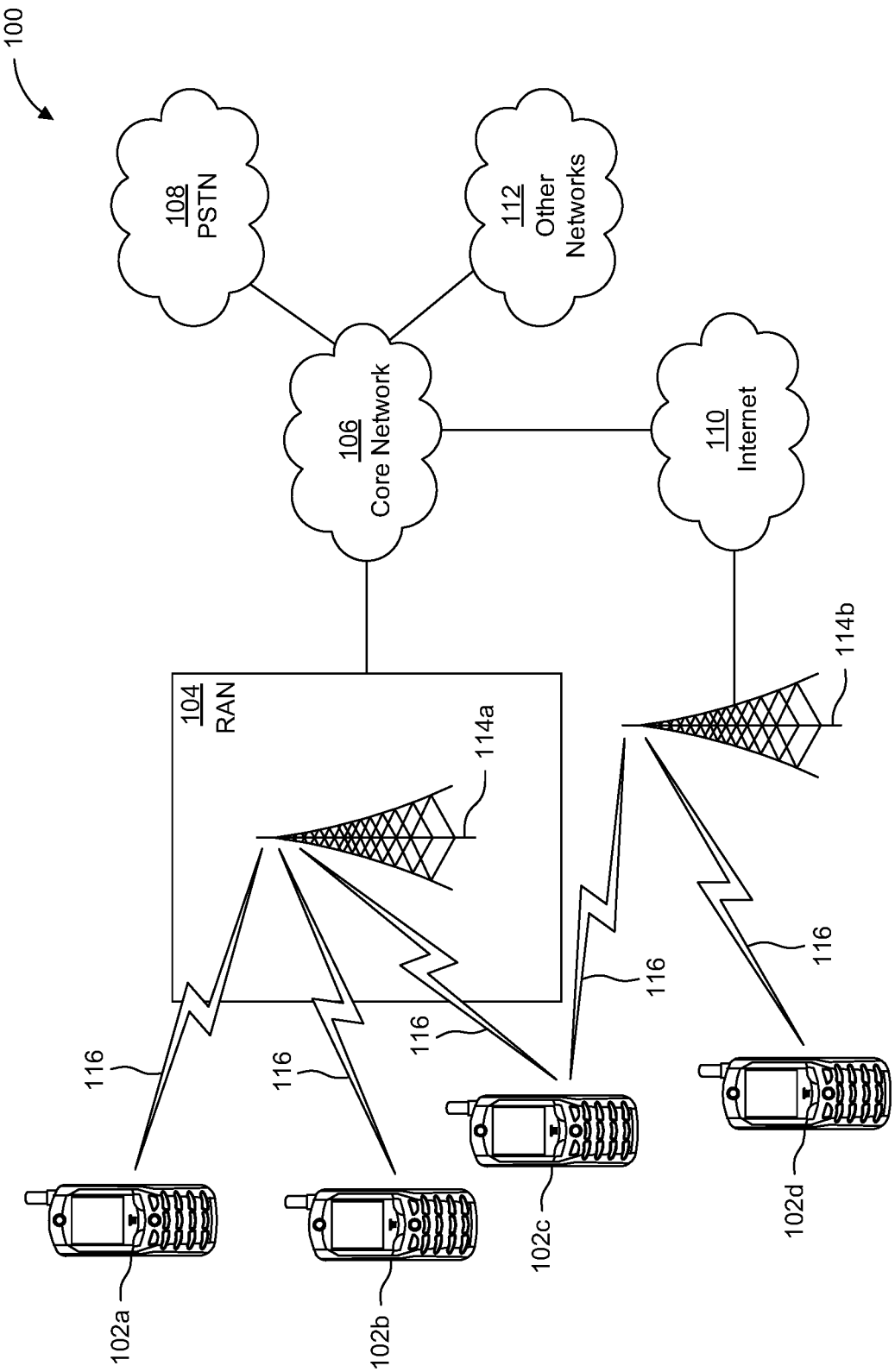
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
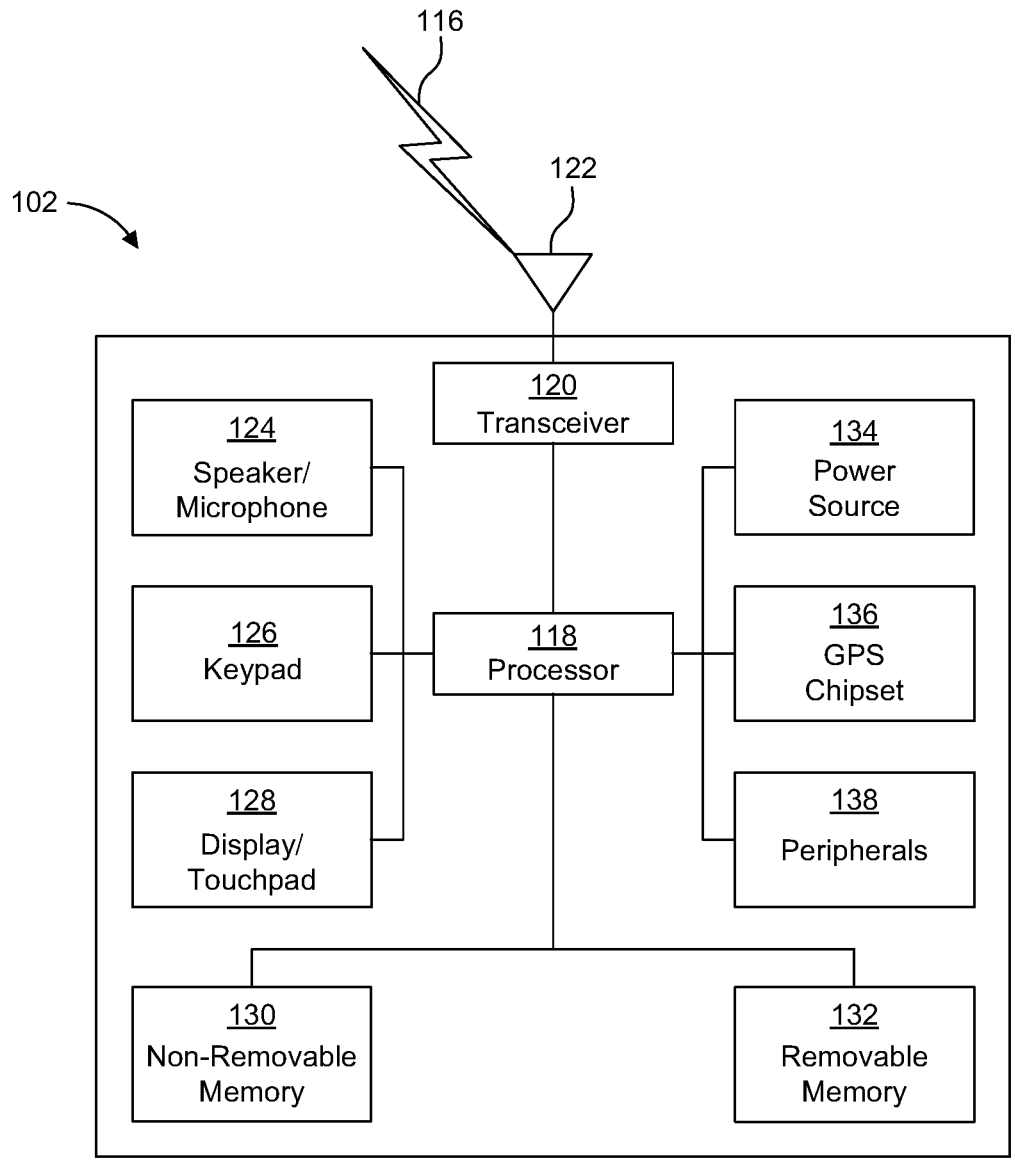
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
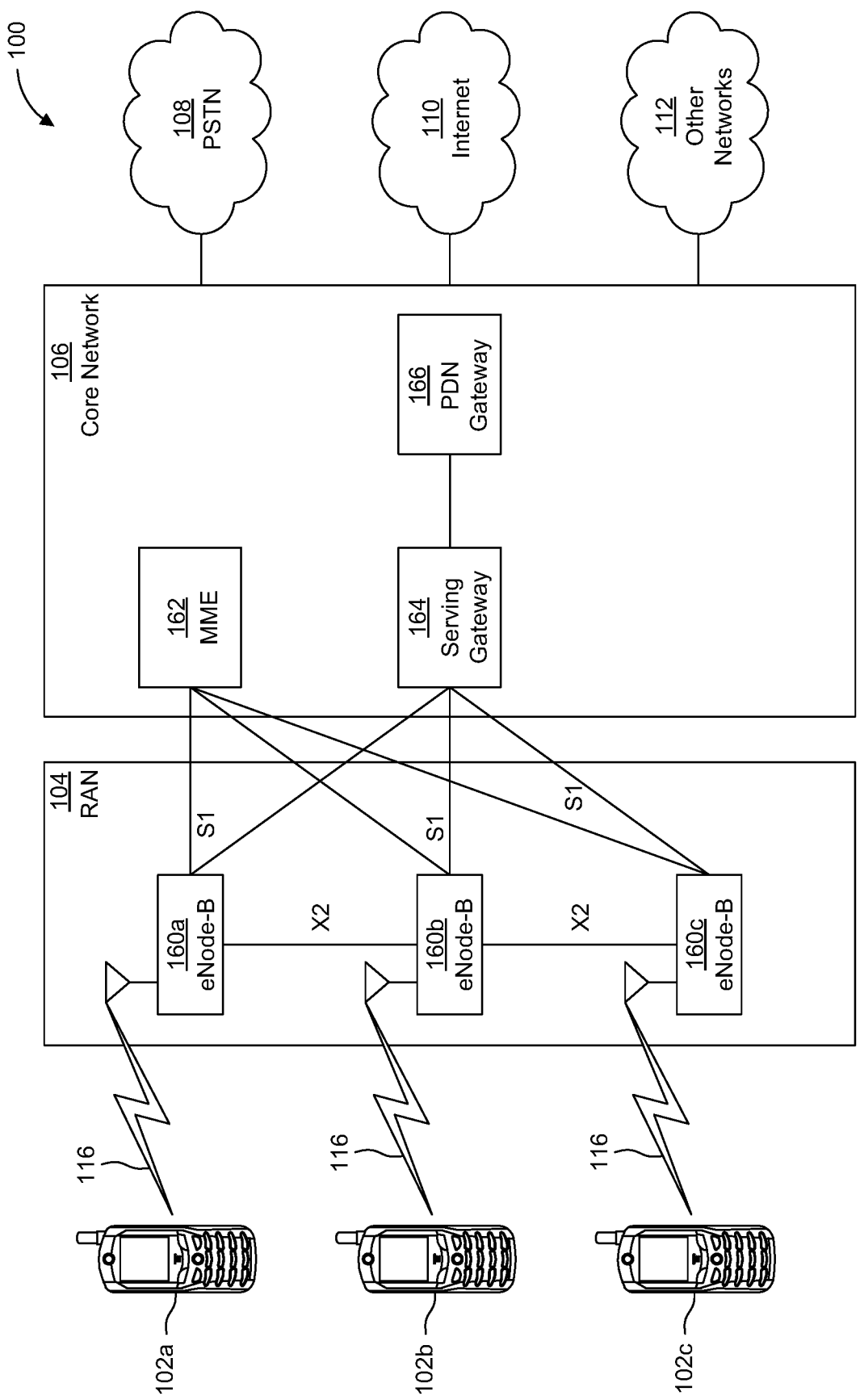
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
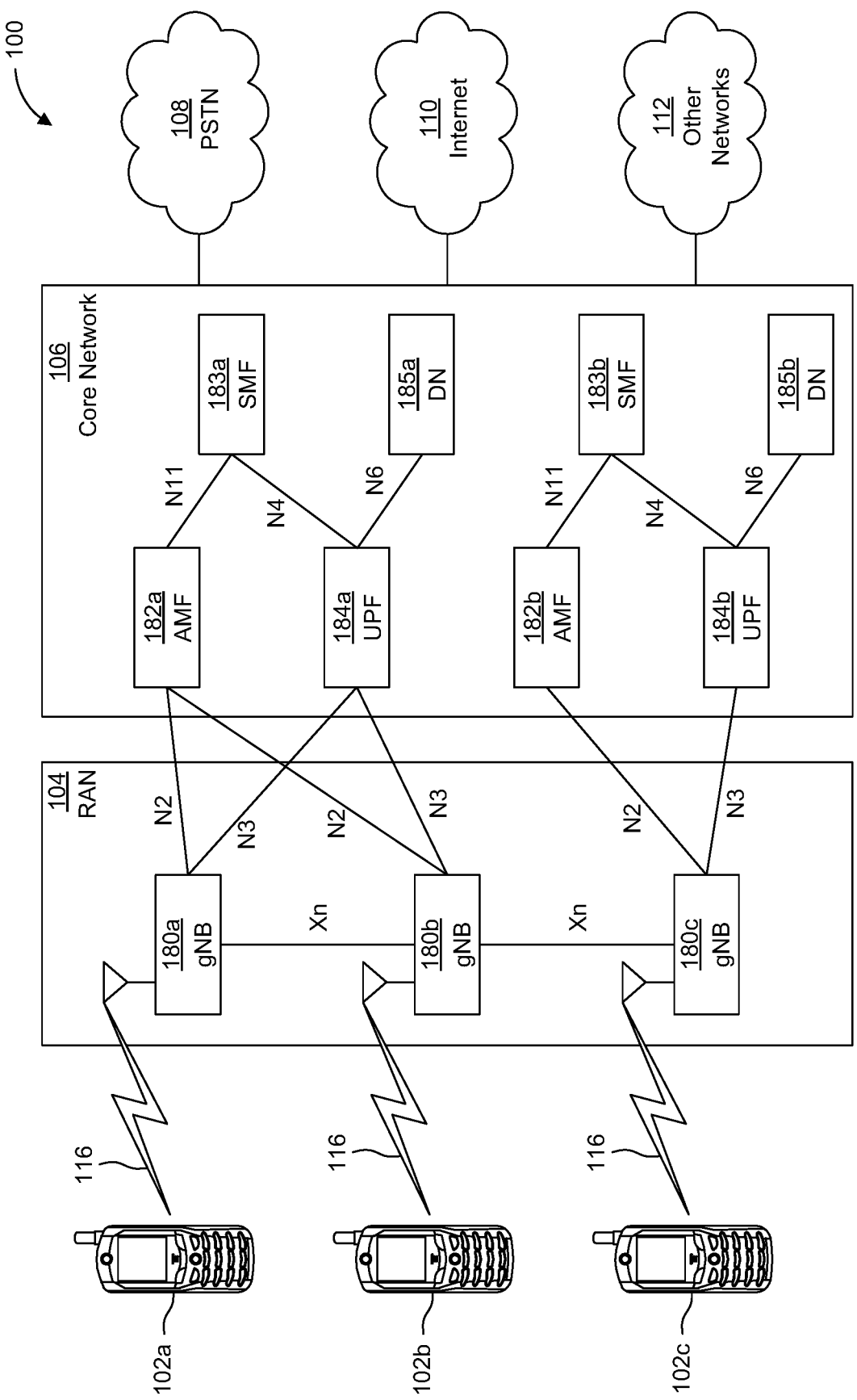
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Operation in an unlicensed frequency band may be subject to some limits on the Transmit Power Control (TPC), the Radio Front end (RF) output power, and power density given by the mean Effective Isotropic Radiated Power (EIRP) and the mean EIRP density at the highest power level. It may further be subject to requirements on the transmitter out of band emissions. The foregoing may be specific to bands and/or geographical locations.

Operation may be further subject to requirements on the Nominal Channel Bandwidth (NCB) and the Occupied Channel Bandwidth (OCB) defined for unlicensed spectrum in the 5 GHz region. The NCB, i.e., the widest band of frequencies inclusive of guard bands assigned to a single channel, may be at least 5 MHz at all times. The OCB, i.e., the bandwidth containing 99% of the power of the signal, may be between 80% and 100% of the declared NCB. During an established communication, a device may be allowed to operate temporarily in a mode where its OCB may be reduced to as low as 40% of its NCB with a minimum of 4 MHz.

Channel access in an unlicensed frequency band may typically use a Listen-Before-Talk (LBT) mechanism. LBT may be typically mandated independently of whether the channel is occupied or not.

For frame-based systems, LBT may be characterized by one or more of the following items: a Clear Channel Assessment (CCA) time (e.g., 20 µs), a Channel Occupancy time (e.g., minimum 1 ms, maximum 10 ms), an idle period (e.g., minimum 5% of the channel occupancy time), a fixed frame period (e.g., equal to the channel occupancy time+the idle period), a short control signaling transmission time (e.g., maximum duty cycle of 5% within an observation period of 50 ms), a CAA energy detection threshold, etc. Typically, a 50 ms observation period may be divided into multiple duty cycles (e.g., 5%, 10%, 20%, 40%, 60%, etc.). Here x % represents the percentage of time where the LTE network is transmitting signal.

For load-based systems (e.g., transmit/receive structure may not be fixed in time), LBT may be characterized by a number N corresponding to the number of clear idle slots in extended CCA instead of the fixed time period. N may be selected randomly within a range.

Deployment scenarios may include different standalone NR-based operation, different variants of dual connectivity operation, e.g., E-UTRAN New Radio—Dual Connectivity (EN-DC) with at least one carrier operating according to the LTE Radio Access Technology (RAT) or NR DC with at least two sets of one or more carriers operating according to the NR RAT, and/or different variants of Carrier Aggregation (CA), e.g., possibly also including different combinations of zero or more carriers of each of LTE and NR RATs.

For example, for LTE, the following functionalities have been considered for a License Assisted Access (LAA) system: LBT before clear channel assessment discontinuous transmission on a carrier with limited maximum transmission duration, carrier selection, Transmit Power Control (TPC), Radio Resource Management (RRM) measurements including cell identification, and Channel-State Information (CSI) measurement, including channel and interference. The above-mentioned functionalities will be described in detail below.

The LBT procedure may be defined as a mechanism by which an equipment may apply a CAA check before using the channel. The CCA may at least utilize energy detection to determine the presence or absence of other signals on a channel in order to determine if this channel is occupied or clear, respectively. European and Japanese regulations mandate the usage of LBT in the unlicensed bands. Apart from regulatory requirements, carrier sensing via LBT may be one way for fair sharing of the unlicensed spectrum and hence it is considered to be a vital feature for fair and friendly operation in the unlicensed spectrum in a single global solution framework.

In unlicensed spectrum, channel availability may not always be guaranteed. In addition, certain regions such as Europe and Japan prohibit continuous transmission and impose limits on the maximum duration of a transmission burse in the unlicensed spectrum. Therefore, discontinuous transmission with limited maximum transmission duration may be a required functionality for LAA.

As there is a large available bandwidth of unlicensed spectrum, carrier selection may be required for LAA nodes to select the carriers with low interference and with that to achieve good coexistence with other unlicensed spectrum deployments.

TPC is a regulatory requirement in some regions by which a transmitting device may be able to reduce its transmit power in proposed of 3 dB or 6 dB compared to its maximum nominal transmit power. This requirement may not need new specifications.

RRM measurements including cell identification may enable mobility between SCells and robust operation in the unlicensed band.

A WTRU operating in an unlicensed carrier may also support the necessary frequency/time estimation and synchronization to enable RRM measurements and successful reception of information on the unlicensed band.

3GPP has started a work item to support NR operation in unlicensed band. One of the objectives is to specify NR-based operation in unlicensed spectrum, including initial access, scheduling/Hybrid Automatic Repeat Request (HARQ), and mobility, along with coexistence methods with LTE-LAA and other incumbent RATs. Deployment scenarios may include different standalone NR-based operations, different variants of dual connectivity operation, e.g., EN-DC with at least one carrier operating according to the LTE RAT or NR DC with at least two sets of one or more carriers operating according to the NR RAT, and/or different variants of Carrier Aggregation (CA), possibility also including different combinations of zero or more carriers of each of LTE and NR RATs.

New Radio unlicensed (NR-U) may support four categories of channel access schemes for NR-U operations. Category 1 may comprise immediate transmission after a short switching gap. Category 2 may comprise LBT without random back-off. Category 3 may comprise LBT with random back-off with fixed contention widow size. Category 4 may comprise LBT with random back-off with variable contention widow size.

LBT has also been agreed to be performed using clear channel assessments on so-called LBT subbands of 20 MHz. A Bandwidth Part (BWP) may be a single LBT subband or may be composed of multiple LBT subbands.

The time during which a channel has been acquired for transmission may be deemed as a Channel Occupancy Time (COT). The COT may be acquired by a WTRU or by a base station and may be subsequently shared with the other node. The total COT duration, including any sharing, may not exceed maximum COT.

Different embodiments according to the present application will be described below. In this application, different solutions are disclosed for a WTRU to operate with incomplete CSI-RS given that channel acquisition failure may affect the presence of some CSI-RS transmissions. The solutions disclosed herein may be applicable to any type of RS (not just CSI-RS) and may be applicable to any signal expected by the WTRU, which may not be present due to failure to acquire the channel to transmit by the gNB.

The first embodiment will be described below. In the first embodiment, for the purpose of determining whether a CSI-RS has been transmitted or not, a WTRU may determine presence of a CSI-RS resource. That is, the WTRU may be configured with a CSI-RS resource on which either a periodic or semi-persistent CSI-RS is expected, and the WTRU may determine the actual presence of the CSI-RS resource prior to performing measurements or prior to feeding back such measurements in order to determine whether a CSI-RS has been transmitted or not. In this embodiment, the WTRU may determine presence of a CSI-RS through one or more of the following items: (1) explicit indication of presence of a CSI-RS resource, (2) implicit indication of presence of a CSI-RS resource, (3) determination of CSI-RS presence based on WTRU measurement, and (4) determination of CSI-RS presence based on a condition being met. The above-mentioned items as well as different solutions related to those items will be described below with reference to detailed embodiments.

A solution related to the explicit indication of presence of a CSI-RS resource will be described below. In order to determine if a CSI-RS has been transmitted, the WTRU may receive an indication from the network. For example, the WTRU may receive an indication from the gNB providing an explicit list of CSI-RS resources that have been transmitted. Such an indication may represent all CSI-RS resources expected within a certain time period prior to the indication being received by the WTRU. The indication may be a bitmap of all expected CSI-RS or a toggled bit indicating the CSI-RS resource transmitted. In another example, the indication may provide a list of CSI-RS index values and/or a list of occasions where the CSI-RS has been actually transmitted. In this application, unless otherwise indicated, the terms "CSI-RS" and "CSI-RS resource" may be used interchangeably. It will be appreciated that since the indication is provided from the network and thus it is explicit to the WTRU (i.e., the WTRU does not necessarily do too much to process the indication in order to obtain the information it needs), this indication may be considered to be an "explicit" indication as opposed to the "implicit" indication discussed below.

In another example, the indication may provide a list of time resources (e.g., slots) where the based station (i.e., gNB) performed transmissions. The WTRU may use this indication as a mask over all possible CSI-RS transmissions and determine that CSI-RS was only ever transmitted in slots that the base station performed transmissions. Such an indication may be used as a post hoc slot blanking pattern. The WTRU may use the slot banking pattern to better determine the slots where CSI-RS has been transmitted or where an interference may be measured. This may enable the WTRU to report two steps of interference measurements: an interference measurement during an active COT and an interference measurement out of COT. Such values may help to determine the presence of hidden nodes and also the probability of acquiring the channel.

Figure 2:
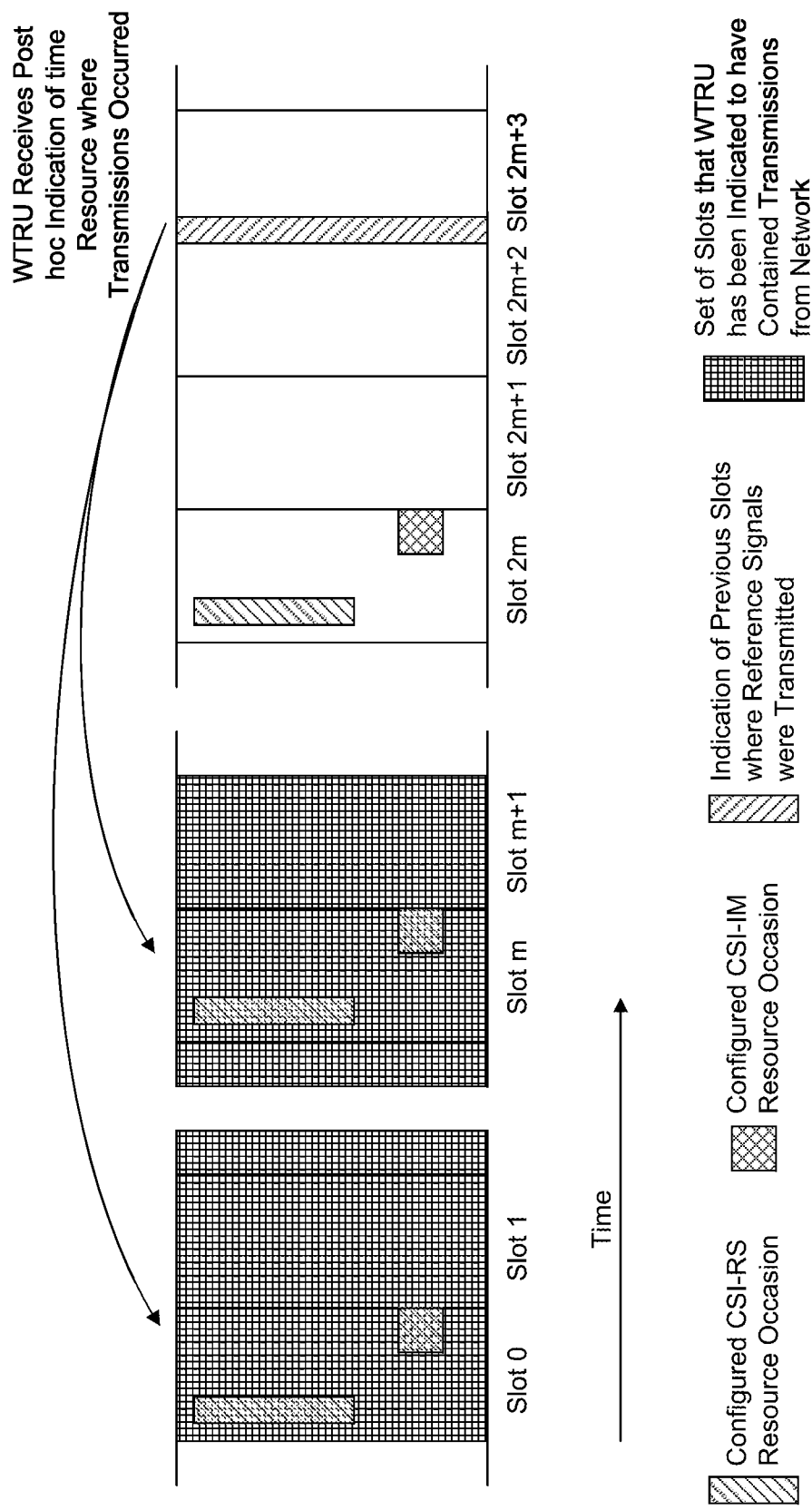
FIG. 2 is a diagram illustrating an indication of presence of Channel State Information Reference Signal (CSI-RS) resources.

The above-discussed indication will be further described with reference to FIG. 2. FIG. 2 is a diagram illustrating an indication of presence of CSI-RS resources. As shown in FIG. 2. a WTRU may be configured with CSI-RS and Channel State Information Interference Measurement (CSI-IM) every m slots. The WTRU may then receive an indication (e.g., in slot 2m+3) of the previous slots where CSI-RS was indeed transmitted by the network. Based on the indication, the WTRU may determine the appropriate reference slot for an upcoming CSI feedback report. Furthermore, the WTRU may segregate the CSI-IM into two groups, those occurring when its serving cell had acquired the unlicensed channel (e.g., in slots 0 and m) and those occurring when the serving cell had not acquired the channel (e.g., in slot 2m). The WTRU may obtain different reports (e.g., different interference measurement reports) based on those two types of CSI-IM and may feedback multiple values.

In embodiments, the indication of the actual transmission of CSI-RS may be received by the WTRU in a periodic CSI request. Such a request may point to a specific transmission occasion of a CSI-RS resource and the WTRU may assume that any transmission occasion of a CSI-RS resource indicated in a periodic CSI request was actually transmitted by the gNB.

A solution related to the implicit indication of presence of a CSI-RS resource will be described below. In embodiments, the implicit indication may be a parameter of a subsequent CSI-RS transmission. That is, the WTRU may determine the presence of a previous CSI-RS based on a parameter of a subsequent CSI-RS transmission, e.g., a subsequent CSI-RS. For example, a parameter of a CSI-RS may cycle through some configured values at each successful transmission. The WTRU may attempt to blindly decode a current CSI-RS using the different possible parameters. Upon detecting the appropriate parameter used for the current transmission (e.g., the current CSI-RS), the WTRU may determine whether previous CSI-RS resources have been actually transmitted or not. The CSI-RS parameters that may be cycled may include at least one of: sequence, CSI-RS resource mapping, antenna ports, orthogonal cover code, and the like.

In embodiments, the implicit indication may be a sequence of consecutive CSI-RS resources, that is, the WTRU may be configured with CSI-RS resources with four possible seeds to generate the sequence. The seeds may be cycled over each four transmissions. The WTRU may be able to determine if up to three consecutive CSI-RS resources have not been transmitted (e.g., due to failed channel acquisition).

Figure 3:
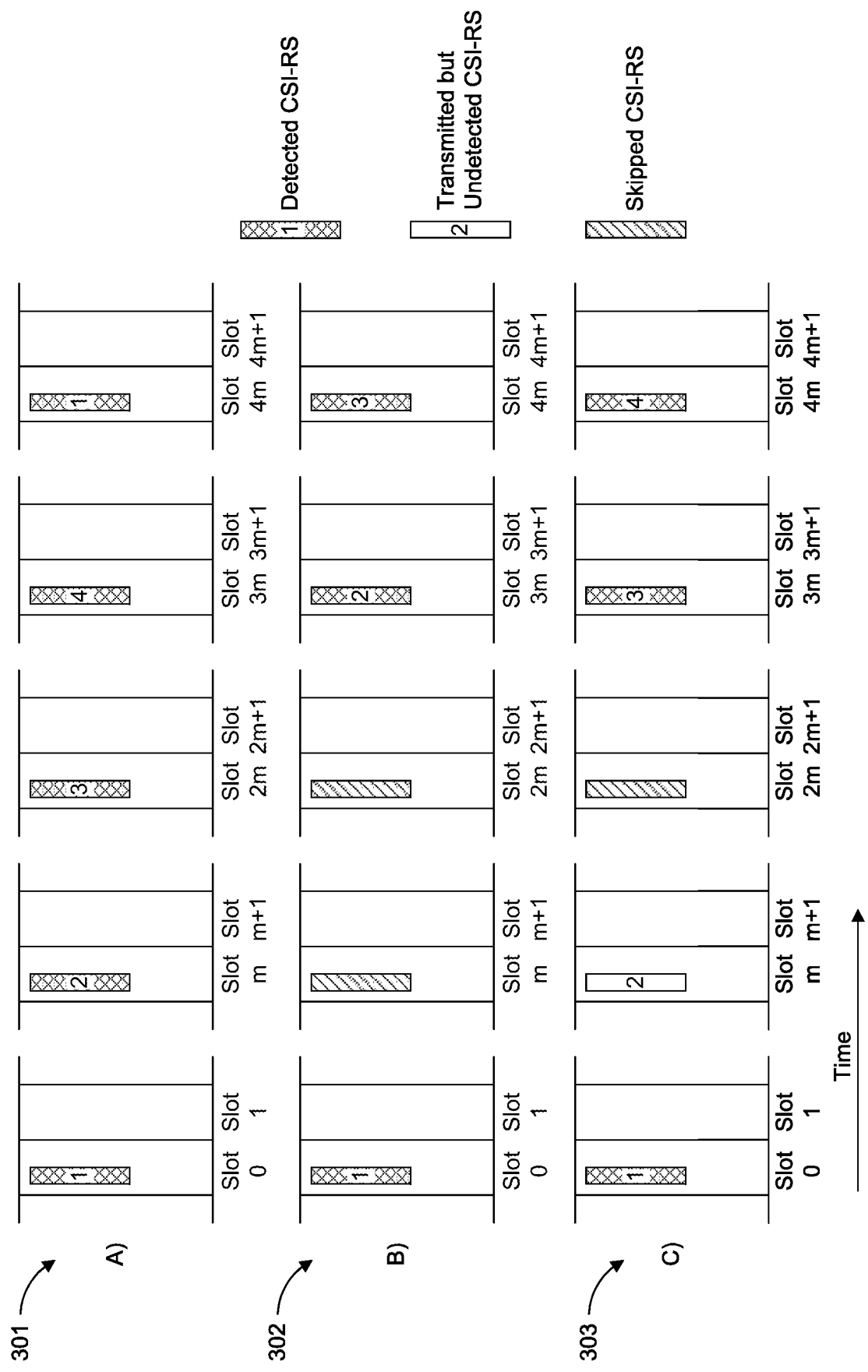
FIG. 3 is a diagram of a WTRU determining the presence or absence of a previous CSI-RS based on a sequence of a currently received CSI-RS.

The above-discussed implicit indication will be further described with reference to FIG. 3. FIG. 3 shows a WTRU determining the presence or absence of a previous CSI-RS based on a sequence of a currently received CSI-RS. As shown in FIG. 3, at 301, the WTRU receives a CSI-RS in every configured occasion and the WTRU performs detection by cycling through 4 sequences. At 302, the WTRU does not detect a CSI-RS in slot m or slot 2m. The WTRU may then receive a CSI-RS in slot 3m with sequence 2. This may indicate to the WTRU that there was indeed no CSI-RS transmitted in slots m and 2m. This may also be used by the WTRU to determine the reference slot for a future CSI feedback report. At 303, the WTRU does not detect a CSI-RS in slot m or slot 2m. The WTRU may then receive a CSI-RS in slot 3m with sequence 3. This may indicate to the WTRU that it missed a transmitted CSI-RS (i.e., a CSI-RS that used sequence 2) in either slot m or slot 2m. It should be appreciated that the above example with 4 sequences for CSI-RS transmission shown in FIG. 3 is not intended to be exclusive or be limiting to the present application. Any other sequences may be available as long as they may help to realize the principle of this application.

In embodiments, the WTRU may not be able to determine which slot had an undetected CSI-RS and may not be able to use that information to determine appropriate measurements based on the previously assumed non-transmitted CSI-RS. In other embodiments, a parameter of the CSI-RS may be modified to enable the WTRU to determine a specific slot where the CSI-RS was missing. For example, the sequence of a subsequent CSI-RS may be determined based on whether one or more previous CSI-RS was skipped and the slot where it was skipped.

A solution related to the determination of CSI-RS presence based on WTRU measurement will be described below. The WTRU may determine that a CSI-RS is present based on a measurement taken on a resource where the WTRU expects the CSI-RS. For example, the WTRU may perform signal-to-interference-plus-noise ratio (SINR) measurements, and any value below a threshold may lead to the WTRU's assumption that the CSI-RS was not transmitted on the resource. The threshold may be configurable.

In another embodiment, the WTRU may perform channel acquisition measurements (e.g., clear channel assessment) prior to a transmission of an expected CSI-RS resource. The WTRU may determine whether the channel is busy prior to the CSI-RS transmission. If the WTRU determines the channel is busy immediately preceding the transmission of the expected CSI-RS resource, it may assume the CSI-RS resource is not transmitted in that instance. Typically, the above-discussed determination may be performed by a processor in the WTRU. Here in this application, unless otherwise indicated, a process performed by the WTRU may typically be performed by its processor.

The WTRU may assume that a CSI-RS resource is present only if a condition is met. In embodiments, if a transmission occasion of a CSI-RS resource coincides with at least one of other transmissions from the gNB and that one of other transmissions is present, then the WTRU may assume that the CSI-RS resource was also transmitted. For example, the WTRU may be configured with a signal, such as a demodulation reference signal (DMRS), to be transmitted in conjunction with a CSI-RS. If the WTRU successfully detects the associated DMRS, the WTRU may assume that the CSI-RS was also transmitted.

In embodiments, the WTRU may only assume a CSI-RS is present if it is transmitted on resources of an active COT. For example, a CSI-RS occasion occurring on LBT sub-bands of an active COT may be assumed present by the WTRU. Therefore, the WTRU may determine the presence of the CSI-RS resource based on an indication of the COT structure, possibly received prior to the transmission occasion of the CSI-RS.

The second embodiment will be described below. The second embodiment is directed to increase the robustness of CSI-RS transmission under a circumstance where a CSI-RS is missing due to a failure of channel acquisition. Increasing the robustness of CSI-RS transmission may be realized by increasing the probability that a periodic or semi-persistent CSI-RS is transmitted. In order to improve the probability that the CSI-RS is transmitted, a WTRU may be configured with multiple transmission occasions tied to a single CSI-RS transmission. In such a case, the WTRU may not expect a single CSI-RS transmission to be transmitted on more than one occasion. Therefore, in the second embodiment, upon determining that a CSI-RS resource has indeed been transmitted in a transmission occasion, the WTRU may not need to continue monitoring other occasions (i.e., conditional occasions) tied to that CSI-RS transmission, and upon determining that the CSI-RS resource has not been transmitted in the transmission occasion, the WTRU may need to continue monitoring other occasions tied to that CSI-RS transmission.

Figure 4A:
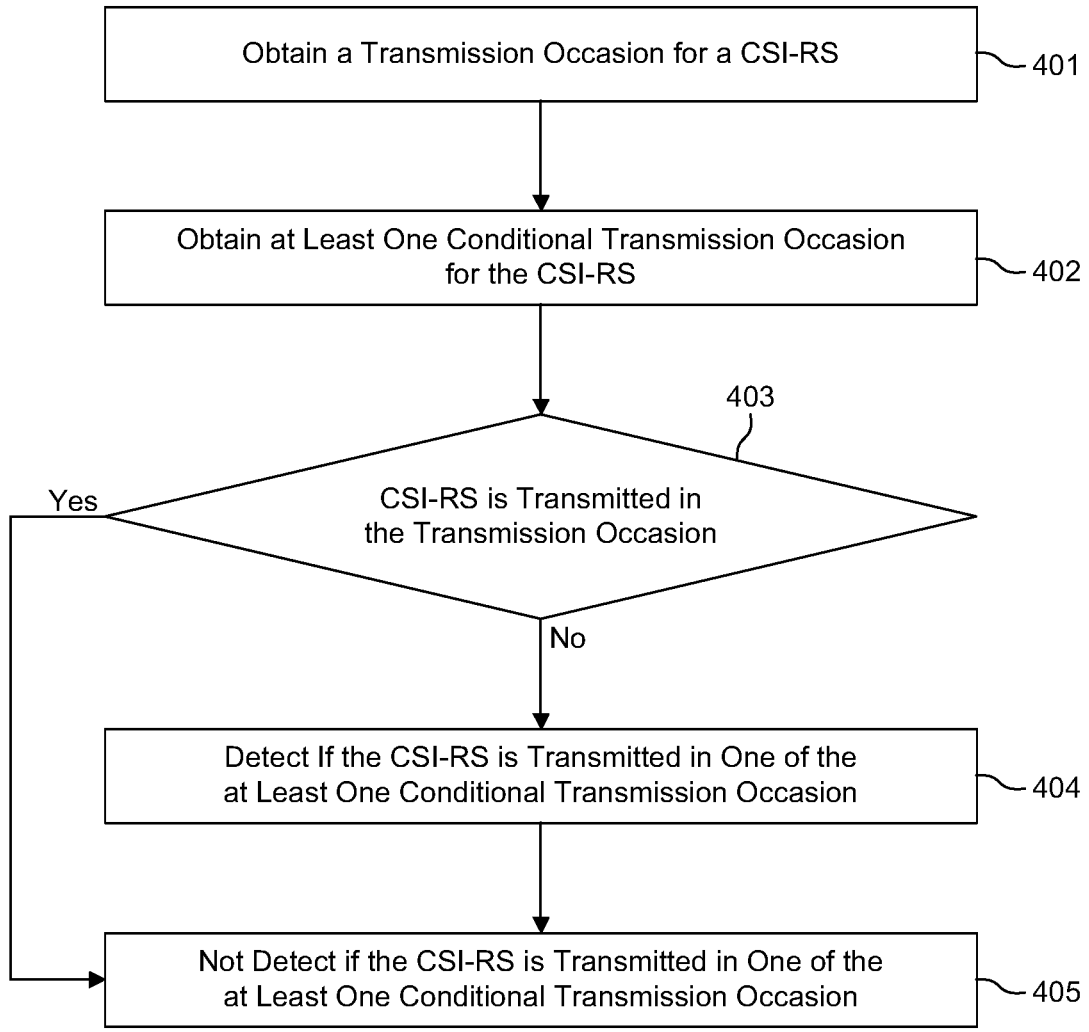
FIG. 4A is a flowchart illustrating a method according to an embodiment of this application.
Figure 4B:
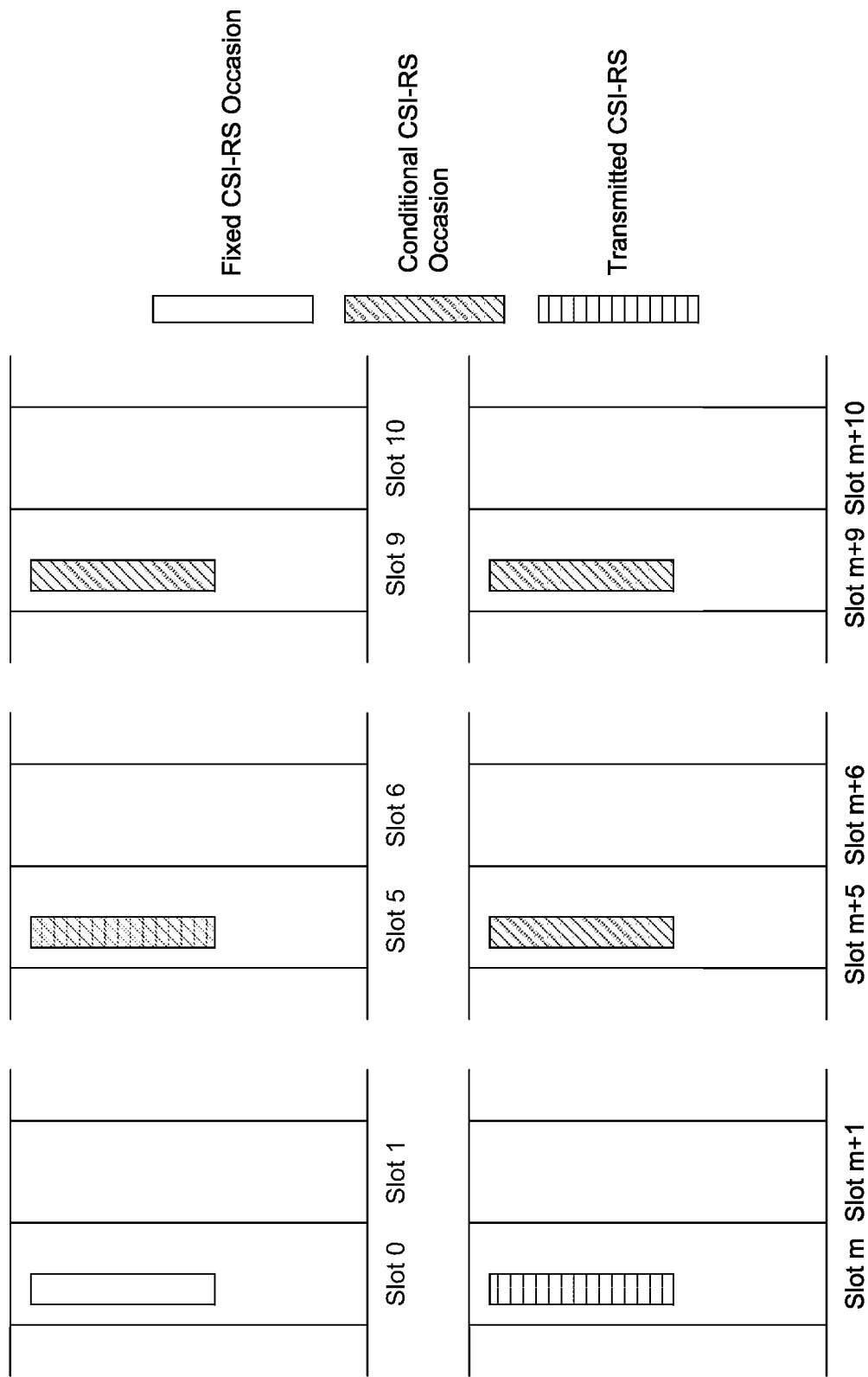
FIG. 4B is a diagram of a CSI-RS configured every $m^{th}$ slot.

The second embodiment will be described in detail below with reference to FIGS. 4A-4B. FIG. 4A is a flowchart illustrating method 400 according to the second embodiment. As shown in FIG. 4A, method 400 may comprise: at 401, obtaining a transmission occasion for a CSI-RS; at 402, obtaining at least one conditional transmission occasion for the CSI-RS; and at 403, determining whether the CSI-RS is transmitted in the transmission occasion, wherein on a condition that the CSI-RS is not transmitted in the transmission occasion, at 404, detecting if the CSI-RS is transmitted in one of the at least one conditional transmission occasion. The above-mentioned processes 401-404 will be described below with reference to detailed examples.

Accordingly, the WTRU may comprise a processor. The processor is configured to obtain a transmission occasion for a channel state information reference signal (CSI-RS); to obtain at least one conditional transmission occasion for the CSI-RS; and to determine whether the CSI-RS is transmitted in the transmission occasion. On a condition that the CSI-RS is not transmitted in the transmission occasion, the processor is further configured to detect if the CSI-RS is transmitted in one of the at least one conditional transmission occasion.

As shown in FIG. 4A, at 401, the method 400 may comprise obtaining a transmission occasion for a CSI-RS.

The transmission occasion may be obtained without any further processing. In embodiments, the transmission occasion may be pre-stored in a memory of the WTRU, and the WTRU may retrieve the transmission occasion from the memory. In embodiments, the transmission occasion may be obtained from the network. In embodiments, the transmission occasion may be obtained from the base station or a 3rd-party device other than the base station. It will be appreciated that the above embodiments regarding different sources of the transmission occasion are not intended to be exclusive or be limiting to the present application.

The transmission occasion may be obtained through additional processing. In embodiments, the transmission occasion may be obtained by processing one or more parameters. The parameters may comprise a reference slot or a default slot, a timing offset, a periodicity, etc. To process at least one of the parameters may obtain the transmission occasion.

For example, at 401, the process of determining the transmission occasion for the CSI-RS may further comprise: obtaining a transmission occasion configuration comprising a timing offset and a periodicity; and determining, based on the timing offset and the periodicity, a timing of the transmission occasion. Accordingly, the WTRU may be configured to obtain a CSI-RS transmission occasion configuration that comprises a timing offset and a periodicity, and to determine, based on the timing offset and the periodicity, a timing of the transmission occasion. In other words, such offset and periodicity may enable the WTRU to determine the timing of each CSI-RS resource occasion for that CSI-RS configuration.

The transmission occasion configuration may be obtained in the same or similar fashion as the above-discussed transmission occasion. For example, the transmission occasion configuration may be obtained from the network, the base station, a 3rd-party device or the memory of the WTRU. This application also does not limit the source of the configuration as long as the configuration may help to realize the principle of this application.

The timing offset and the periodicity in the transmission occasion configuration may be used to determine the timing of the transmission occasion. The timing offset may represent a timing offset value with respect to a reference timing (e.g., a reference slot). The periodicity may represent the length between two successive transmission occasions, that is, how many slots within a transmission occasion periodicity. For example, the value of the timing offset is 0, and the value of the periodicity is m. In that case, the WTRU may determine that the transmission occasion is slot 0, slot m, slot 2m, etc. Thus the timing of the transmission occasion may be obtained. It will be appreciated that the above-discussed timing offset and the periodicity as well as their values are given as an example, and they are not intended to be exclusive or be limiting to the present application. The above-discussed process at 401 will be further described later below with reference to FIG. 4B.

As shown in FIG. 4, method 400 may comprise: at 402, obtaining at least one conditional transmission occasion for the CSI-RS. That is, the WTRU may obtain one or more conditional transmission occasions associated to the CSI-RS transmission occasion obtained at 401.

The at least one conditional transmission occasion may be obtained without any further processing. The at least one conditional transmission occasion may be obtained in the same or similar fashion as the above-discussed transmission occasion. For example, the at least one conditional transmission occasion may be obtained from the network, the base station, a 3rd-party device or the memory of the WTRU. This application also does not limit the source of the conditional transmission occasion as long as it may help to realize the principle of this application.

The at least one conditional transmission occasion may be obtained through additional processing. In embodiments, the at least one conditional transmission occasion may be obtained by processing one or more parameters. The parameters may comprise a reference slot or a default slot, a timing offset, a periodicity, etc. To process at least one of the parameters may obtain the transmission occasion.

For example, at 402, the process of obtaining at least one conditional transmission occasion for the CSI-RS further may further comprise: obtaining a conditional transmission occasion configuration which comprises at least one conditional timing value; and determining, based on the at least one conditional timing value, the at least one conditional transmission occasion. Accordingly, to obtain at least one conditional transmission occasion for the CSI-RS, the processor is further configured to obtain a conditional transmission occasion configuration which comprises at least one conditional timing value, and to determine, based on the at least one conditional timing value, the at least one conditional transmission occasion.

The conditional transmission occasion configuration may indicate one or more conditional timing values associated to the CSI-RS transmission occasion obtained at 401. Such conditional timing values may provide resources for one or more conditional CSI-RS transmissions, e.g., the at least one conditional transmission occasion. For example, there is a conditional timing value, i.e., 5 in the conditional transmission occasion configuration, which represents that a conditional transmission occasion is the 5th slot after the transmission occasion obtained at 401. For example, there are two conditional timing values, i.e., 5 and 9, in the conditional transmission occasion configuration. In that case, there are two conditional transmission occasions, the 5th slot and the 9th slot after the transmission occasion obtained at 401. It should be appreciated that the above examples regarding the conditional timing value are only given by way of example, and they are not intended to be exclusive or be limiting to the present application. The conditional transmission occasion will be further described later below with reference to FIG. 4B.

In embodiments, the conditional transmission occasion configuration and the above-discussed transmission occasion configuration may be incorporated into a single configuration. That is to say, the WTRU may obtain a single configuration which comprises both transmission occasion configuration needed for the process at 401 and the conditional transmission occasion configuration needed for the process at 402. Therefore, the above-discussed parameters, such as the timing offset, the periodicity, and the conditional timing value, may be included into this single configuration.

The conditional transmission occasion is used for the transmission of a CSI-RS and it is directed to a condition that a previous associated timing (e.g., a transmission occasion obtained at 401, a previous conditional transmission occasion obtained 402) was not used for the CSI-RS transmission. In this application, unless otherwise indicated, the terms "transmission occasion", "CSI-RS transmission occasion", "CSI-RS transmission" and "CSI-RS occasion" may be used interchangeably, while the terms "conditional transmission occasion", "CSI-RS conditional transmission occasion", "CSI-RS conditional transmission" and "CSI conditional occasion" may be used interchangeably.

As shown in FIG. 4A, after the process at 401, the WTRU may determine that the timing offset is 0 and the periodicity is m, and may further determine that a CSI-RS transmission occasion is configured every $m^{th}$ slot, the first CSI-RS transmission occasion is slot 0, and the next CSI-RS transmission occasion is slot m. Furthermore, after the process at 402, the WTRU may determine that each CSI-RS transmission occasion is configured with two conditional timing values, i.e., 5 and 9. Therefore, the WTRU may determine that. the corresponding conditional transmission occasions with respect to slot 0 are slot 5 and slot 9, and the corresponding conditional transmission occasions with respect to slot m are slot m+5 and slot m+9.

Then, the method 400 may proceed to the process at 403. At 403, the method 400 may comprise determining whether the CSI-RS is transmitted in the transmission occasion, wherein on a condition that the CSI-RS is not transmitted in the transmission occasion, at 404, detecting if the CSI-RS is transmitted in one of the at least one conditional transmission occasion. The method 400 may further comprise on a condition that the CSI-RS is transmitted in the transmission occasion (i.e., "Yes" at 403), at 405, not detecting if the CSI-RS is transmitted in one of the at least one conditional transmission occasion.

The WTRU may only need to attempt a CSI-RS in a conditional transmission occasion if the CSI-RS was not transmitted in (1) the associated fixed transmission occasion and (2) any previous conditional transmission occasions associated with the same fixed transmission occasion. For example, if the WTRU does not detect a CSI-RS in slot 0, then it monitors slot 5 for the CSI-RS. Once it detects a CSI-RS in slot 5, it may not need to monitor slot 9 for a CSI-RS transmission. In slot m, if the WTRU detects a CSI-RS, then it may not need to monitor any associated conditional transmission occasions in slot m+5 and slot m+9. If the WTRU detects a CSI-RS in a slot, the WTRU may assume resources mapped to subsequent conditional CSI-RS (for example, associated with the detected CSI-RS resource) may be reused for the transmission of other signals or channels. For example, the RE mapping of a transmission overlapping a transmitted conditional CSI-RS may require puncturing (or rate matching around) the resources of the conditional CSI-RS. The RE mapping of a transmission overlapping the resources of an un-transmitted conditional CSI-RS may not require puncturing (or rate matching around) the resources of the conditional CSI-RS.

In the second embodiment, the WTRU may detect a CSI-RS in the transmission occasion and the conditional transmission occasion through the methods disclosed in the above first embodiment. For example, the WTRU may determine whether a CSI-RS is transmitted based on an indication of presence of the CSI-RS resource. For another example, the WTRU may determine whether a CSI-RS is transmitted by detecting whether a channel is busy immediately preceding the transmission occasion. The different methods for detecting the CSI-RS transmission may be referred to the above first embodiment.

In the example illustrated in FIG. 4, the slot 0 is used as a reference slot, and thus if the timing offset is 0, then the reference slot will be used as transmission occasion for the CSI-RS. It will be appreciated that the reference slot may be any other available slot. Also, when configured with a CSI-RS conditional timing value, a WTRU may use, as a reference slot for a feedback measurement, any CSI-RS occasion or any CSI-RS conditional occasion associated to the original reference slot tied to the feedback measurement.

In embodiments, the WTRU may perform measurements on a CSI-RS transmission occasion and depending on if the measurement meets a criterion (e.g., a threshold value), the WTRU may determine whether to attempt detection of the CSI-RS in an upcoming associated conditional transmission occasion. Given that the WTRU may autonomously determine which resource to use to feedback CSI measurements, the WTRU may indicate to the network which resource (original occasion or conditional occasion) it is using when providing feedback measurements. This may enable the network to determine whether the WTRU is affected by a hidden mode.

In embodiments, the WTRU may be configured with a CSI-RS resource whose transmission occasion timing may depend on another transmission. That is, the transmission occasion obtained at 401 may be determined based on another transmission. For example, the WTRU may expect the CSI-RS transmission occasion to be determined based on the timing of an associated DMRS transmission or an associated DRS (discovery reference signals) transmission. Given that a DMRS transmission or a DRS transmission may be transmitted at any moment during a pre-configured window, the timing of associated CSI-RS may vary depending on the actual time of the DMRS transmission or the DRS transmission. It should be appreciated that the above-discussed DMRS transmission and DRS transmission are only given by way of example, and they are not intended to be exclusive or be limiting to the present application. The transmission occasion obtained at 401 may also depend on any other available transmission as long as it may help to realize the principle of this application.

In embodiments, the WTRU may be configured with a CSI-RS resource for which at least one transmission parameter(s) (e.g. timing, bandwidth, sequence and the like) may depend on at least one parameter. That is, the CSI-RS transmission (for example, CSI-RS timing, CSI-RS frequency, the number of ports of a CSI-RS transmission during COT, a per-resource block structure of a CSI-RS, etc.) may be determined based on at least one other parameter. The at least one other parameter may comprise a COT timing (for example, a start timing of COT), a density of CSI-RS transmissions, etc. The following will describe the at least one other parameter which may be used to determine a CSI-RS transmission occasion with reference to detailed examples.

For example, the CSI-RS transmission occasion may be determined based on a start timing of the COT. In such an example, a CSI-RS resource associated to the CSI-RS transmission occasion may be configured with an offset based on the starting timing of the COT. The CSI-RS resource may also be configured with a periodicity based on a duration of the COT. Since the start timing of the COT may vary, the CSI-RS transmission occasion may also vary. In this application, unless otherwise indicated, the start timing of a COT may also be referred to as a COT timing.

In some cases, such variable timing may lead to collision of the CSI-RS transmission with other transmissions. For example, a variable timing CSI-RS may collide with a non-variable timing CSI-RS, a DRS, a control resource set (CORESET), or a DMRS. In such a case, the WTRU may use a possibly configurable priority of transmissions to determine where to expect the presence of a CSI-RS at a given time. For example, a CSI-RS resource may have an index, and upon a collision occurring, the WTRU may only expect the presence of the CSI-RS with highest or lowest index value.

The WTRU may expect all types of CSI-RS to use variable timing. For example, zero power (ZP) CSI-RS, used for physical downlink shared channel (PDSCH) mapping, may also be shifted according to a COT timing and/or duration.

The WTRU may be configured with an association of a report configuration with one or several resource sets indicating a set of downlink resources on which measurement of CSI should be carried out. However, due to the uncertainty of LBT and the start timing of the COT, the network may not shift or switch the CSI-RS transmission to further time symbol/slots/frame and/or adjust the CSI-RS density in the frequency domain. It may also modify the per-resource-block structure of the CSI-RS transmission.

In embodiments, the CSI-RS transmission may be determined based on a per-resource block structure of a CSI-RS resource within a COT. For example, a CSI-RS resource associated to the CSI-RS transmission occasion may be configured with a CSI-RS resource mapping corresponding to a density of the CSI resource. That is, the transmission occasion configuration obtained at 401 may also comprise a CSI-RS resource mapping corresponding to the density of the CSI resource. The density of the CSI resource may be defined as the number (N) of resource elements per resource block. Based on the outcome of LBT (e.g., duration of the COT, bandwidth acquired, etc.), the base station may reduce the number of ports of a given CSI-RS transmission during a COT. For this purpose, the CSI-RS configuration may consist of M aggregated size-$x_i$ CSI resources, according to the following Equation 1.

$$\Sigma_{i=1}^{M} x_i = N \qquad \text{Eq. 1}$$

Here, M represents the full-sized configured CSI-RS resource by RRC. The different aggregation level may be indexed from 1 to M.

In embodiment, the density reduction may be explicit. The WTRU receives in the aperiodic trigger state the density of the CSI resource for the duration of the COT. The WTRU may also receive a DCI with a dedicated DCI field for the activation of one aggregated level at the start of the COT.

In embodiment, the density reduction may be implicit, The WTRU may be configured with a mapping between aggregation levels and a COT duration. For example, the WTRU may be initially configured with a size-$x_M$ CSI resource for COT duration T longer than K slots, that is downsized to size-$x_{M-1}$ when V≤T<K, and downsized to size-$x_{M-2}$ when W≤T<V etc. This may give aims to the network to prioritize a type of transmission (e.g., PDSCH for high requirements WTRU) over CSI-RS transmission when the time duration of the acquired channel is low.

Similarly, the implicit density downsizing may be performed by the WTRU based on the identification of the acquired sub-bands during the COT. A similar mapping between acquired subband and CSI resource density may be configured to the WTRU.

In embodiments, the CSI-RS transmission may be determined based on a density of CSI-RS transmissions. For example, the per-resource-block structure outlined above may need to be adapted to the COT start timing. For example, if the COT starts in the middle of a slot, the structure may be switched to one or more symbols within a given RB where the CSI-RS is transmitted. Thus, the WTRU may maintain the same CSI structure per resource block (i.e., the same frequency and time separation, code division), but only apply a time offset to the start of CSI-RS transmission within a given RB. The WTRU may either apply this switching only to the first slot of the COT or further to multiple slots of the COT.

In the case of periodic CSI-RS transmission, the WTRU may assume that the configured CSI-RS transmission occurs every $N^{th}$ slot.

Similarly, as described above, the WTRU may be configured with a mapping of COT duration and CSI-RS transmission occurrence in time. If the COT duration is greater than K slots, the WTRU may expect a CSI-RS transmission with periodicity of N (for example, every $N^{th}$ slot). If the COT duration is less than K slots, then the WTRU may for example expect a CSI-RS transmission with a periodicity of N-T (that is, every N-T slot), where T may be a configurable value or may be determined as a function of K. This modification of time structure can also be signaled by the network by means of a Downlink Control Information (DCI) at the COT initiation.

In embodiments, the density of CSI-RS transmissions in the frequency may be modified. For example, the per-resource-block structure outlined above may need to be adapted based on the outcome of the base station channel acquisition. For example, a CSI-RS may be configured for CSI-RS transmission in every RB corresponding to a density equal to 1, every two RBs corresponding to a density equal to ½, etc. The WTRU may further be configured with a relationship between the number of acquired bandwidth in the active DL Bandwidth Part (BWP) and the density of CSI-RS transmissions. For example, if all subbands of the active DL BWP are acquired by the base station, the WTRU may expect the lowest density of CSI-RS transmissions. While if only a subset of the subbands of the active DL BWP are acquired, the WTRU may expect a higher density of the configured CSI-RS within the acquired subbands.

The WTRU may also expect two different density schemes of the CSI-RS transmissions within and outside the COT. If the WTRU has received an indication of a channel acquisition indicating that the base station has acquired a set of subbands or the WTRU has acquired a set of subbands (i.e., a scenario within the COT), it may apply a first CSI-RS transmission density. If the WTRU or the based station has not acquired a set of subbands (i.e., a scenario outside the COT), the WTRU may apply a second density scheme.

The WTRU may be configured with an alternative CSI-RS configuration as a substitute of the resources associated with the report configuration of a triggered state that is used by the WTRU only when a set of conditions are satisfied. These conditions may be associated with at least one of the following parameters: COT duration, acquired bandwidth, the number of previous reported CSI feedback, the number of non-transmitted CSI-RS or the number skipped CSI reports due to LBT failure, etc. It should be appreciated that the above-mentioned parameters associated with the conditions are not intended to be exclusive or be limiting to the present application. The conditions may also associated with any other parameter as long as those conditions may help to realize the principle of the application.

The configured alternative CSI-RS configuration may have, for example, a higher density in term of time/frequency. For example, the WTRU may be configured with a n-port CSI-RS with a given density (e.g., single port CSI-RS with density 3, corresponding to 3 REs per RB). The WTRU may apply the n-port CSI-RS if the acquired channel bandwidth and/or time duration is lower than a certain value or if the WTRU has not been able to perform any measurements on the CSI-RS resources or report feedback for the past n timing instances.

In embodiments, the transmission occasion configuration may further comprise a CSI-RS triggering offset. The CSI-RS triggering offset may indicate the number of slots between the slot containing the DCI that triggers a set of aperiodic non-zero power (NZP) CSI-RS resources and the slot in which the CSI-RS resource is transmitted.

The CSI-RS resource may have been triggered in a DCI within one COT and transmitted in a slot of a next COT. If the network has not been able to acquire the channel sufficiently long, the WTRU may consider that the CSI-RS will be transmitted on the minimum value between the COT duration and the CSI-RS triggering offset.

In alternate embodiments, if the CSI-RS transmission slots exceeds the maximum number of slots in the COT duration, the WTRU may monitor the CSI-RS with a dedicated granularity. This granularity may be one of the following: (1) a static preconfigured RRC pattern, e.g., every odd slot; or (2) an RRC pre-configured pattern that is a function of different COT durations. For example, for COT duration from 1 to x slots, the WTRU may monitor the CSI with a first granularity (e.g., every slot), for COT duration from x+1 slots to n slots, the WTRU may monitor the CSI with a second granularity (e.g., every odd or even slot); for COT duration from n+1 slots to y slots, the WTRU may monitor the CSI with a third granularity (e.g., every t slot), etc. It will be appreciated that the above examples regarding different granularities are only exemplary, and they are not intended to be exclusive or be limiting to the present application.

CSI-RS based measurements will be described below. A WTRU operating with multiple LBT subbands may be configured to perform measurements on one or multiple CSI-RSs resources present in multiple subbands. In one method, the WTRU may expect one or multiple CSI-RSs to be contained within a single LBT subband. In such a case, the WTRU may report a feedback for the one or multiple CSI-RSs included in LBT subbands where the one or multiple CSI-RSs were transmitted. The WTRU may indicate the set of LBT subbands for which a feedback is reported. In alternate embodiments, the WTRU may pad a feedback report to ensure consistent size regardless of number of actually transmitted CSI-RS resources.

In an alternate embodiment, a CSI-RS may span multiple LBT subbands. In such a case, the WTRU may report measurements for a portion of the CSI-RS that was transmitted. For example, the WTRU may use the subband reporting such that each subband measurement corresponds to a portion of the CSI-RS that was present.

The WTRU may report a wideband CSI feedback covering multiple portions of the CSI-RS that was present. For example, the WTRU may be configured with a CSI-RS spanning a number (x) of LBT subbands. However, the WTRU may only receive CSI-RS in a first and second LBT subbands. The WTRU may determine to report a wideband CSI feedback where the wideband bandwidth is assumed to be the first and second LBT subbands (i.e., all the subbands where the CSI-RS was received). A wideband feedback may only be determined for sets of contiguous LBT subbands. The WTRU may report multiple wideband feedbacks, each for sets of contiguous LBT subbands. A wideband CSI feedback may indicate the set of CSI-RS resources (or LBT subbands) to which the wideband CSI feedback applies.

An embodiment regarding cross COT measurements and reports will be described below. The WTRU may receive a CSI-RS resource in a first COT, but only have applicable feedback resources in a subsequent second COT. In such a case, the WTRU may be configured with a validity timer. The WTRU may determine the validity of a feedback report based on the time between a CSI-RS reception and the next upcoming valid feedback report resource. In this application, unless otherwise indicated, the terms "feedback" and "feedback report" may be used interchangeably.

In embodiment, a WTRU feeding back measurements in a COT based on CSI-RS resources received in a previous COT may provide measurements applicable to COT parameters or feedback COT parameters. For example, a WTRU receiving a CSI-RS resource in a first COT composed of a first set of LBT subbands may only have feedback resources in a second COT composed of a second set of LBT subbands. The WTRU may report at least one of: measurements applicable to the LBT subbands of the first COT, measurements applicable to the LBT subbands of the second COT, or measurements applicable to the set of LCT subbands applicable to both the first and second COT. In such an example, if the CSI-RS received in the first COT is applicable to the first set of LBT subbands, the second set of LBT subbands, and the third set of LBT subbands, but the second COT is only active in the second set of LBT subbands, then the WTRU may report measurements only applicable to the second set of LBT subbands.

A feedback report instance may be tied to a reference slot or a subframe. However, in some cases, the CSI-RS in the reference slot may not be present. Therefore, the WTRU may assume a set of reference slots are tied to each feedback report instance.

In one embodiment, the WTRU may only report measurements for a single CSI-RS occasion within the set of reference slots. The WTRU may use, as a reference slot, the earliest or latest reference slot within the set where the CSI-RS is present. In another embodiment, the WTRU may perform measurements on a subset of reference slots within the set of reference slots where the CSI-RS is present. In another embodiment, the WTRU may perform average measurements over a subset of reference slots within the set of reference slots where the CSI-RS is present.

The WTRU may report a feedback even when no CSI-RS was transmitted. This may enable AN indication of a hidden note at the WTRU. Such a feedback may indicate no valid measurements are available. In another solution, the WTRU may report interference values without desired channel measurements applicable to the reference slot (or the set of reference slots) associated with the CSI-RS resources.

In one embodiment, the WTRU may request a CSI-RS transmission, e.g., if no CSI-RS is present in the set of reference slots associated with a feedback report occasion. The WTRU's request for the CSI-RS may point to a specific aperiodic/periodic/semi-persistent CSI-RS resource. For example, the WTRU's request may come in a WTRU-acquired COT, in which case, the WTRU may indicate the parameters of the COT to the network in order to activate the CSI-RS with COT timing dependencies.

The WTRU may determine the contents of a CSI feedback based on the relative timing of the associated CSI-RS resource and the physical uplink control channels (PUCCH) or physical uplink shared channels (PUSCH) resource for the CSI feedback. Furthermore, the WTRU may determine the contents of a CSI feedback based on parameters associated with the CSI-RS transmission and the transmission of the CSI feedback. For example, the WTRU may determine the content of the feedback, and possibly whether the feedback is to be reported at all, based on whether the CSI-RS resource and the CSI feedback resource are in the same COT. For example, if the CSI feedback resource is in the same COT as the associated CSI-RS resource, the WTRU may provide a full CSI feedback report (e.g., including subband reports). If the CSI feedback resource is in a COT subsequent to the COT where the associated CSI-RS resource is located, the WTRU may provide a reduced set of CSI reports (e.g., only wideband values).

In an alternate embodiment, the contents of the CSI feedback report may also depend on the time gap between the COT where the CSI-RS resource was received and the COT where the CSI feedback is reported. For example, as the time gap increases, the WTRU may reduce the granularity of the contents of the feedback report.

In an embodiment, PUCCH resources may be dynamically triggered to transmit CSI feedback. Such dynamically triggered PUCCH resources may enable the WTRU to perform CAT1 or CAT2 PBT prior to accessing an unlicensed channel.

In an embodiment, the WTRU may be configured with a set of PUCCH resources. The WTRU may only use the set of PUCCH resources if they are dynamically triggered by the base station. The trigger may indicate to the WTRU a reference slot from which feedback report measurements should be obtained. In another solution, the dynamically triggered PUCCH resources may be preconfigured with a reference slot (or a set of reference slots) from which to obtain CSI measurements.

CSI feedback may not have value unless a WTRU may be scheduled in the DL. For cases where the WTRU has no valid resources on which to feedback CSI with a current COT, it may not make sense to acquire a new COT for the sole purpose of transmitting CSI feedback that may not be useful. The WTRU may (e.g., may only) acquire a COT for the sole purpose of transmitting CSI feedback if it has been indicated in a previous COT that it may expect more DL data transmissions. For example, the WTRU may have received transmission in a first COT and may have performed measurements on a CSI-RS resource present during the first COT. The WTRU may not have any more feedback resources within the first COT. If the WTRU receives an indication that it may expect more DL data transmissions in a subsequent COT, the WTRU may attempt to acquire the channel prior to CSI feedback resources in order to provide the base station with relevant CSI feedback information.

In an embodiment, the WTRU may acquire the COT and transmit CSI feedback if it also needs to transmit HARQ feedback for a previous COT. The WTRU may multiplex the CSI feedback with the HARQ feedback. In a variant of the embodiment, the WTRU may only multiplex CSI feedback if there is at least one Negative Acknowledgement (NACK) in the HARQ feedback, given that the WTRU may then expect another DL transmission.

If the WTRU is configured to report multiple CSI feedbacks including a Channel Quality Indicator (CQI), a Channel Resource Indicator (CRI), L1-beam measurement results, Precoding Matrix Indicator (PMI), Rank Indicator (RI), Layer Indicator (LI), the WTRU may need to perform LBT to acquire UL resources to transmit the CSI feedback report, and base the content of the feedback report on the outcome of LBT or timing of successful LBT. For example, if the WTRU is configured to report multiple types of feedback, the WTRU may only report a subset of the configured report quantities. The WTRU may be configured with a priority associated with the reporting content that is a function of the LBT outcome. For instance, CRI may have the highest priority, CQI the second, L1-RSRP the third, PMI the fourth, etc.

The WTRU may also report the quantities associated with one reporting instance in different reports based on the amount of acquired UL resource or LBT outcome. The WTRU may further indicate to the network the association between two different quantities reported in two different reporting instances corresponding to the same trigger state.

A time domain behavior of the CSI-ReportConfig is indicated by a higher layer parameter reportConfigType and can be set to 'aperiodic', 'semiPersistentOnPUCCH', 'semiPersistentOnPUSCH', or 'periodic'. The WTRU may have an association of the report configuration type and the type of LBT where the WTRU may perform to acquire the resources for the CSI feedback. For example, if the WTRU is configured with periodic reporting on PUCCH, it may also be configured with a condition that the PUCCH is only used if it requires an LBT category 2 or lower. Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

It will be appreciated that the terminology used in the present application is for the purpose of describing particular embodiments and is not intended to limit the application. The singular forms "a", "the", and "the" may be intended to comprise a plurality of elements. The terms "including" and "comprising" are intended to include a non-exclusive inclusion. Although the present application is described in detail with reference to the foregoing embodiments, it will be appreciated that those foregoing embodiments may be modified, and such modifications do not deviate from the scope of the present application.

What is claimed:

1. A method for use in a wireless transmit/receive unit (WTRU), the method comprising:
   receiving first information indicating one or more first transmission occasions for receiving channel state information reference signal (CSI-RS) transmissions;
   receiving second information indicating one or more second transmission occasions for receiving CSI-RS transmissions; and
   receiving, responsive to a determination that a CSI-RS transmission is not received in a first one of the one or more first transmission occasions, a CSI-RS transmission in at least one of the one or more second transmission occasions.

2. The method of claim 1 further comprising:
   receiving, responsive to a determination that a CSI-RS transmission is received in the first one of the first set of transmission occasions, for another CSI-RS transmission in a second one of the first set of transmission occasions.

3. The method of claim 1, wherein a determination whether the first CSI-RS transmission is received in the first one of the first set of transmission occasions is based on a measurement, based on a received indication from a base station, or based on a parameter of another CSI-RS transmission.

4. The method of claim 1, wherein the second information indicating the one or more second transmission occasions for receiving CSI-RS transmissions indicates one or more time offset values from one of the one or more first transmission occasions.

5. The method of claim 1, wherein at least one parameter of the one or more first transmission occasions or of the one or more second transmission occasions is determined based on a parameter associated with a channel occupancy time (COT).

6. The method of claim 5, wherein the at least one parameter comprises one or more of: time and frequency resources, or a number of antenna ports.

7. The method of claim 1 further comprising transmitting information indicative of a feedback report, wherein content of the feedback report is based on timing of a received CSI-RS transmission and timing of the transmission including the information indicative of the feedback report.

8. The method of claim 7, wherein the information indicative of the feedback report provides feedback associated with a CSI-RS transmission received in a slot, wherein the slot is one of a plurality of slots associated with the feedback report.

9. The method of claim 8, wherein the feedback associated with the CSI-RS transmission received in the slot comprises feedback associated with a plurality of CSI-RS transmissions received in a corresponding plurality of slots.

10. The method of claim 8, wherein the feedback report includes one or more of a signal-to-interference-plus-noise ratio (SINR) measurement, a channel quality indicator (CQI), a channel resource indicator (CRI), a precoding matrix indicator (PMI), a rank indicator, or a layer indicator (LI).

11. A wireless transmit/receive unit (WTRU) comprising:
    a processor; and
    a transceiver;
    the processor and the transceiver configured to receive first information indicating one or more first transmission occasions for receiving channel state information reference signal (CSI-RS) transmissions;
    the processor and the transceiver configured to receive second information indicating one or more second transmission occasions for receiving CSI-RS transmissions; and
    the processor and the transceiver configured to receive, responsive to a determination that a CSI-RS transmission is not received in a first one of the one or more first transmission occasions, a CSI-RS transmission in at least one of the one or more second transmission occasions.

12. The WTRU of claim 11, wherein the processor and the transceiver are configured to receive, responsive to a determination that a CSI-RS transmission is received in the first one of the first set of transmission occasions, for another CSI-RS transmission in a second one of the first set of transmission occasions.

13. The WTRU of claim 11, wherein a determination whether the first CSI-RS transmission is received in the first one of the first set of transmission occasions is based on a measurement, based on a received indication from a base station, or based on a parameter of another CSI-RS transmission.

14. The WTRU of claim 11, wherein the second information indicating the one or more second transmission occasions for receiving CSI-RS transmissions indicates one or more time offset values from one of the one or more first transmission occasions.

15. The WTRU of claim 11, wherein at least one parameter of the one or more first transmission occasions or of the one or more second transmission occasions is determined based on a parameter associated with a channel occupancy time (COT).

16. The WTRU of claim 15, wherein the at least one parameter comprises one or more of: time and frequency resources, or a number of antenna ports.

17. The WTRU of claim 11 wherein the processor and the transceiver are configured to transmit information indicative of a feedback report, wherein content of the feedback report is based on timing of a received CSI-RS transmission and timing of the transmission including the information indicative of the feedback report.

18. The WTRU of claim 17, wherein the information indicative of the feedback report provides feedback associated with a CSI-RS transmission received in a slot, wherein the slot is one of a plurality of slots associated with the feedback report.

19. The WTRU of claim 18, wherein the feedback associated with the CSI-RS transmission received in the slot comprises feedback associated with a plurality of CSI-RS transmissions received in a corresponding plurality of slots.

20. The WTRU of claim 18, wherein the feedback report includes one or more of a signal-to-interference-plus-noise ratio (SINR) measurement, a channel quality indicator (CQI), a channel resource indicator (CRI), a precoding matrix indicator (PMI), a rank indicator, or a layer indicator (LI).

* * * * *